US012492587B1

(12) United States Patent
Weis

(10) Patent No.: US 12,492,587 B1
(45) Date of Patent: Dec. 9, 2025

(54) STORM DOOR SPEED ARRESTER AND TRAVEL PATH LIMITER

(71) Applicant: Bradley Weis, Morris, IL (US)

(72) Inventor: Bradley Weis, Morris, IL (US)

( * ) Notice: Subject to any disclaimer, the term of this patent is extended or adjusted under 35 U.S.C. 154(b) by 28 days.

(21) Appl. No.: 18/423,251

(22) Filed: Jan. 25, 2024

(51) Int. Cl.
*E05F 3/10* (2006.01)

(52) U.S. Cl.
CPC ............. *E05F 3/10* (2013.01); *E05Y 2201/47* (2013.01); *E05Y 2900/132* (2013.01)

(58) Field of Classification Search
CPC ............. E05Y 2201/47; E05Y 2201/41; E05Y 2900/132; E05F 1/10; E05F 3/10; E05F 15/627; E05C 3/045; E05C 3/40; E05C 17/04; E05C 17/50; Y10T 292/0951
See application file for complete search history.

(56) References Cited

U.S. PATENT DOCUMENTS 251,854 A * 1/1882 Fisher, Jr. ............... E05C 19/10 292/341.15
1,077,487 A * 11/1913 Miller ................. E05B 65/0007 74/543
2,166,620 A * 7/1939 Bellah ..................... E05C 19/10 292/202
3,660,939 A * 5/1972 Suita ........................ E05F 13/04 49/404
3,782,765 A * 1/1974 Wallyn .................... E05C 19/10 292/204
3,934,907 A * 1/1976 McGillivray ........... E05C 17/50 292/DIG. 32
3,966,245 A * 6/1976 Losenno ................. E05C 17/50 292/202
4,357,732 A * 11/1982 Hickman ................ E05F 1/025 16/81
4,929,004 A * 5/1990 Chidester .............. E05B 15/022 292/DIG. 19

(Continued)

FOREIGN PATENT DOCUMENTS

CN 109958360 A * 7/2019 ................ E05F 1/16
DE 4323382 A1 * 4/1994 ............ E05F 1/1016

(Continued)

OTHER PUBLICATIONS

Youtube video demonstration of automatic screen door closer, DIY Fab, published approximately Apr. 2022 https://www.youtube.com/watch?v=uWi5r8eaq2g (Year: 2022).*

*Primary Examiner* — Jason W San
*Assistant Examiner* — Matthew J Sullivan
(74) *Attorney, Agent, or Firm* — Cramer Patent & Design, PLLC.; Aaron R. Cramer

(57) ABSTRACT

The present device concerns a screen door closing device, designed to control the opening and closing behavior of screen doors. The device includes a spring-loaded retraction reel housing a tape, which extends and retracts along a defined path. The device features two mechanical adjustments for controlling the tape's extension length and speed. A unique tee fitting and mounting bracket arrangement ensures secure attachment to the screen door, while a rotatable base plate with ball bearings facilitates smooth operation. The device can be quickly disconnected from the door for maintenance or other purposes. This device represents a significant improvement over existing door mechanisms by offering enhanced control, durability, and ease of use.

1 Claim, 4 Drawing Sheets

(56) References Cited

U.S. PATENT DOCUMENTS 5,273,326 A * 12/1993 Kinkaide ................ E05C 17/04
292/DIG. 38
6,006,475 A * 12/1999 Schwantes .............. E05F 15/63
49/140
6,910,302 B2 6/2005 Crawford
7,124,469 B2 * 10/2006 Tsekhanovsky .......... E05F 1/16
49/404
7,226,091 B2 * 6/2007 Amy ....................... E05C 17/14
292/262
7,600,345 B2 * 10/2009 Slopack ................ E05F 15/627
49/358
7,686,405 B2 * 3/2010 Trulaske, Sr. .......... E05F 1/025
49/404
10,646,034 B2 * 5/2020 Olson ....................... F25D 3/06
2003/0062726 A1 * 4/2003 Corbett ................... E05C 19/10
292/101
2004/0168284 A1 9/2004 Duffy
2008/0120923 A1 5/2008 Coe
2014/0137477 A1 * 5/2014 Ooe ...................... E05F 15/622
49/358
2015/0026922 A1 1/2015 Chao
2016/0097228 A1 4/2016 Wypych et al.
2019/0360251 A1 11/2019 Kondratuk
2022/0127897 A1 4/2022 Tannoury et al.
2022/0162894 A1 5/2022 Seppänen et al.
2022/0270935 A1 8/2022 Yang et al.

FOREIGN PATENT DOCUMENTS

KR 102070810 B1 * 1/2020
KR 102477790 B1 * 12/2022
KR 102653825 B1 * 4/2024
WO WO-2023100171 A1 * 6/2023 ................ E05F 1/10

* cited by examiner

STORM DOOR SPEED ARRESTER AND TRAVEL PATH LIMITER

RELATED APPLICATIONS

None.

FIELD OF THE DEVICE

The present device relates to door mechanisms, specifically to a screen door closing device. This field encompasses devices and systems designed to control the movement and positioning of screen doors, particularly focusing on their closure and open limits.

BACKGROUND OF THE DEVICE

Traditional screen door mechanisms often lack precision and durability, leading to issues such as overextension, rapid wear, and potential damage to door frames. The screen door closing device of the present device addresses these shortcomings by introducing an adjustable, retractable, and robust system. This device provides an improvement over the prior art by offering precise control over the door's opening speed and extent, thanks to its dual mechanical adjustments, a robust retraction reel, and an efficient ball bearing assembly for smooth operation. This advancement not only increases the lifespan of screen doors but also significantly reduces repair costs and improves user convenience.

SUMMARY OF THE DEVICE

Embodiments of the present disclosure may include a screen door closing device, including a spring-loaded retraction reel housed within the device, configured to manage the movement of a tape. In some embodiments, the tape may be extendable from and retractable into the retraction reel along a predefined path. In some embodiments, the device may include a first mechanical adjustment mechanism integrated into the retraction reel, designed to set the maximum extendable length of the tape. In some embodiments, the adjustment mechanism allows customization of the tape's extension according to the specific dimensions and requirements of a screen door.

In some embodiments, the device may include a second mechanical adjustment mechanism, also integrated into the retraction reel, responsible for controlling the rate of extension and retraction of the tape. In some embodiments, this mechanism provides a means to regulate the speed at which the tape extends and retracts, thus controlling the opening speed of the attached screen door.

In some embodiments, the device may include a tee fitting located at the distal end of the tape, designed to engage with a distal mounting bracket. In some embodiments, the distal mounting bracket includes a receiving cavity and a slot to securely hold the tee fitting, enabling a stable connection to the screen door. In some embodiments, the distal mounting bracket may be configured to be mounted on the interior surface of the screen door, facilitating the attachment and operation of the tape and tee fitting.

In some embodiments, the device may include a rotatable base plate connected to the retraction reel, enabling the retraction reel to move along a specified path. In some embodiments, the base plate includes an upper and a lower plate, featuring a ball bearing assembly to ensure smooth, frictionless rotation. In some embodiments, the rotatable base plate includes a quick disconnecting means for easy detachment and attachment to a proximal mounting bracket. In some embodiments, the quick disconnecting means enables straightforward installation and removal of the device for maintenance or adjustment purposes.

In some embodiments, the proximal mounting bracket may be adapted for attachment to a door jamb, aligning the retraction reel in an optimal position for the operation of the screen door. In some embodiments, the device, may include a configuration that allows the device to be used in conjunction with an automatic closing means, such as a pneumatic or hydraulic cylinder, to control the closing speed and extent of the screen door. In some embodiments, the device acts as a supplementary mechanism to enhance the functionality and longevity of the screen door. In some embodiments, the device may be constructed to be adaptable for different screen door sizes and types and may be capable of being painted or colored for aesthetic customization.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

DESCRIPTIVE KEY

Figure 1:
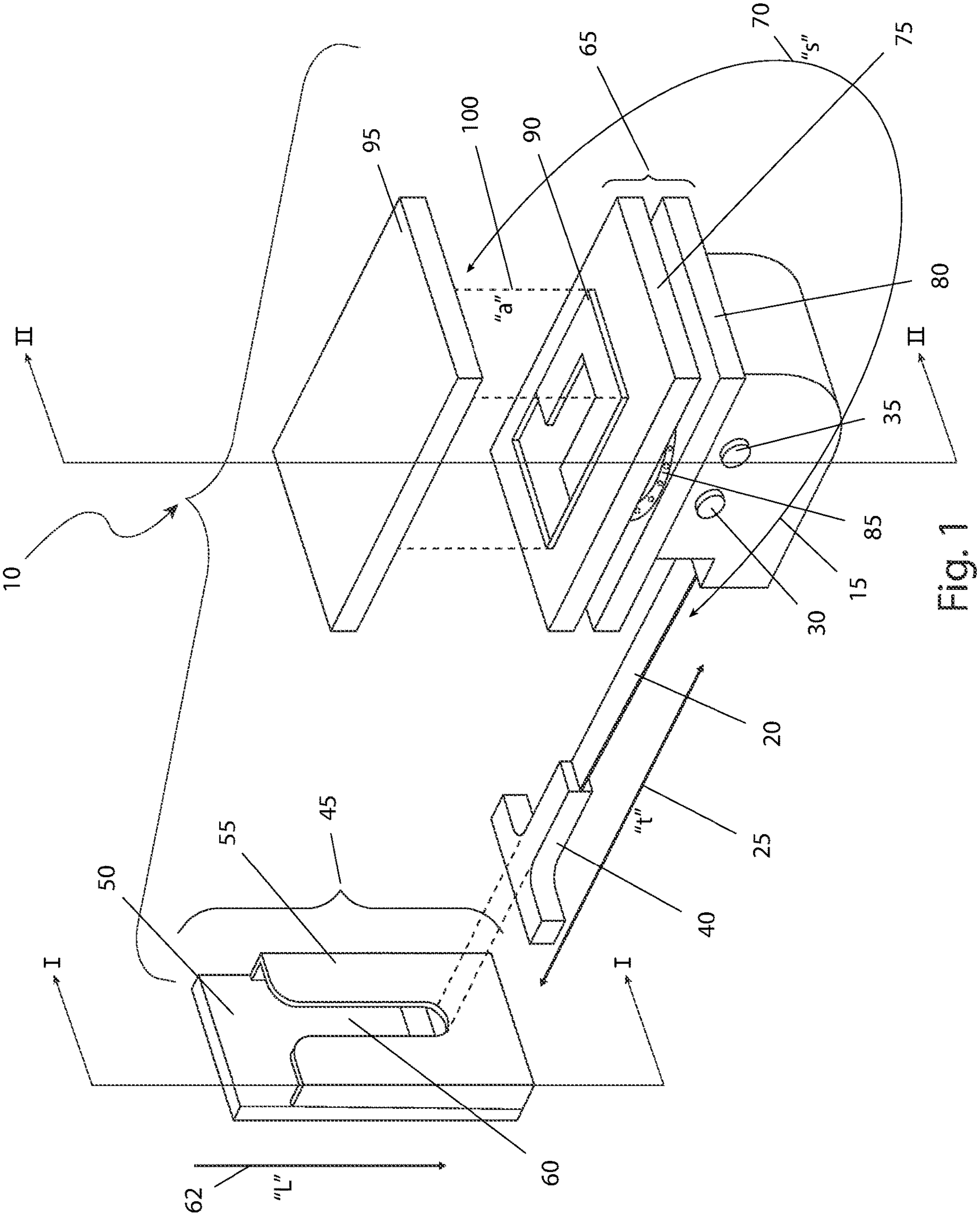
FIG. 1 is a perspective view of a screen door closing device 10, according to the preferred embodiment of the present device.

10 screen door closing device
15 retraction reel
20 tape
25 travel path "t"
30 first mechanical adjustment
35 second mechanical adjustment
40 tee fitting
45 distal mounting bracket
50 first back plate
55 front receiving cavity
60 receiving slot
62 travel path "l"
65 rotatable base plate
70 travel path "s"
75 upper plate
80 lower plate
85 ball bearing assembly
90 quick disconnecting means
95 proximal mounting bracket
100 attachment connection path "a"
105 screen door
110 interior screen door surface
115 door jamb
120 automatic closing means
125 fastening means

130 upper race
135 lower race
140 ball bearing

DESCRIPTION OF THE PREFERRED EMBODIMENTS

The best mode for carrying out the device is presented in terms of its preferred embodiment, herein depicted within FIGS. 1 through 4. However, the device is not limited to the described embodiment, and a person skilled in the art will appreciate that many other embodiments of the device are possible without deviating from the basic concept of the device and that any such work around will also fall under scope of this device. It is envisioned that other styles and configurations of the present device can be easily incorporated into the teachings of the present device, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the screen door closing device 10, according to the preferred embodiment of the present device is disclosed. The screen door closing device 10 (herein also described as the "device") 10, includes a spring-loaded retraction reel 15 which houses a tape 20 that moves in and out of the retraction reel 15 along a travel path "t" 25. The retraction reel 15 is provided with two (2) mechanical adjustments. A first mechanical adjustment 30 provides mechanical adjustment for the overall extended length of the tape 20, or how far the tape 20 can extend from the retraction reel 15. A second mechanical adjustment 35 provides mechanical adjustment for the rate of speed at which the second mechanical adjustment 35 can be extended, or the overall time it takes for the tape 20 to reach the limit of extension as controlled by the first mechanical adjustment 30. Further description of the ability of the first mechanical adjustment 30 and the second mechanical adjustment 35 will be provided herein below.

The distal end of the tape 20 is provided with a tee fitting 40 which connects into a distal mounting bracket 45. The distal mounting bracket 45 comprises a first back plate 50, further having a front receiving cavity 55 and a receiving slot 60. The tee fitting 40 slides into the receiving slot 60 along a travel path "l" 62 whereupon the front receiving cavity 55 retains the tee fitting 40. The upper portion of the retraction reel 15 is permanently affixed to a rotatable base plate 65 which allows relative motion of the retraction reel 15 along a travel path "s" 70.

The rotatable base plate 65 is provided with an upper plate 75 and a lower plate 80 constructed with intermediate ball bearing assembly 85 for smooth, trouble-free and long-lasting swiveling ability. The upper portion of the upper plate 75 is provided with a quick disconnecting means 90 such as a cam lock, angled linkage, thumbscrews, magnetic means, lever lock, or the like, which connects to a proximal mounting bracket 95. The exact method of connection employed by the quick disconnecting means 90 is not intended to be a limiting factor of the present device. However, such attachment is intended to occur along an attachment connection path "a" 100. It is envisioned that the components of the device 10 including the retraction reel 15, the tee fitting 40, the distal mounting bracket 45, the proximal mounting bracket 95 and the like would be made available in different colors such as white, black, almond or the like. It is also envisioned that the present device may also be painted by the final user as well for custom color installations. The removal functionality provided by the quick disconnecting means 90 and the proximal mounting bracket 95, allow for the removal of the device 10 should the screen door 105 need to be opened fully for furniture travel, repair of the screen door 105, or the like.

Figure 2:
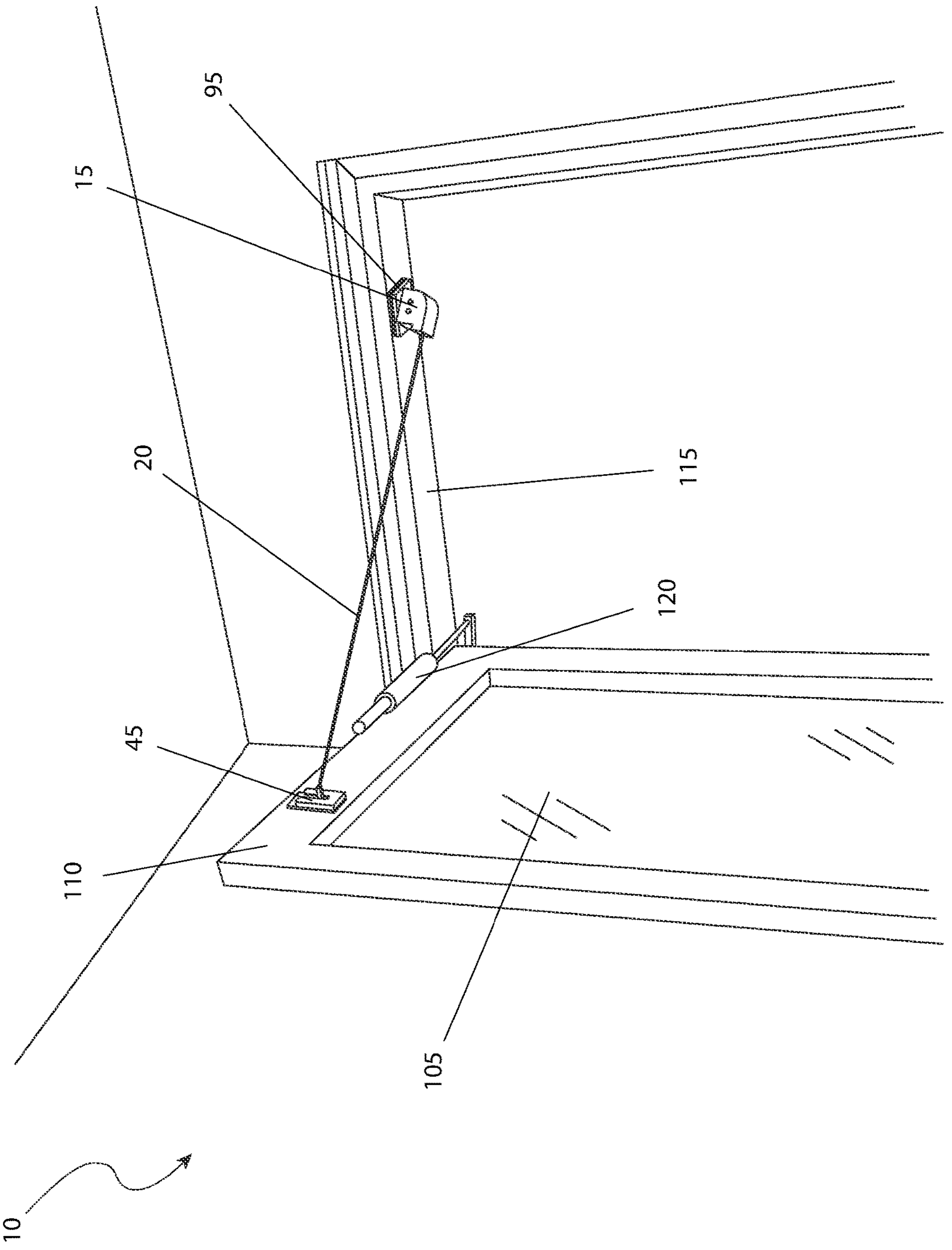
FIG. 2 is an environmental view of the screen door closing device 10, shown in an installed state, according to the preferred embodiment of the present device.

Referring next to FIG. 2, an environmental view of the device 10, shown in an installed state, according to the preferred embodiment of the present device is depicted. The device 10 is installed on a screen door 105, typically as located on the exterior side of a house, business establishment, garage, or the like. The distal mounting bracket 45 is mounted to the interior screen door surface 110, preferably at the top distal area of the screen door 105. The retraction reel 15, along with the proximal mounting bracket 95, is mounted to a corresponding mounting position along the door jamb 115 so as to not interfere with the operation of the screen door 105 or the main door (not shown). The tape 20 is shown extended and connected to the distal mounting bracket 45 via the tee fitting 40 and the receiving slot 60 (both of which are shown in FIG. 1). As such, the tee fitting 40 may be easily disconnected from the distal mounting bracket 45 in a manner of seconds without the use of tools or specialized skills. As such, the functionality and opening ability of the screen door 105 may be easily eliminated should the screen door 105 need to be opened fully for furniture travel, repair of the screen door 105, or the like.

It is envisioned that the present device would be made available as a stand-alone item in a kit format for installation on existing screen door 105. It would also be made available as a standard or optional item on all new screen door 105 as well. It is intended that the device 10 be used with an automatic closing means 120 such as a pneumatic or hydraulic cylinder, weighted pull lines or the like. The use of the device 10 is solely to limit the speed of the screen door 105 as it is opening as well as limit how far the screen door 105 may open during normal opening and closing cycles. Such a feature is envisioned to eliminate damage to the screen door 105, the door jamb 115, the automatic closing means 120, and other nearby surfaces and devices.

Figure 3:
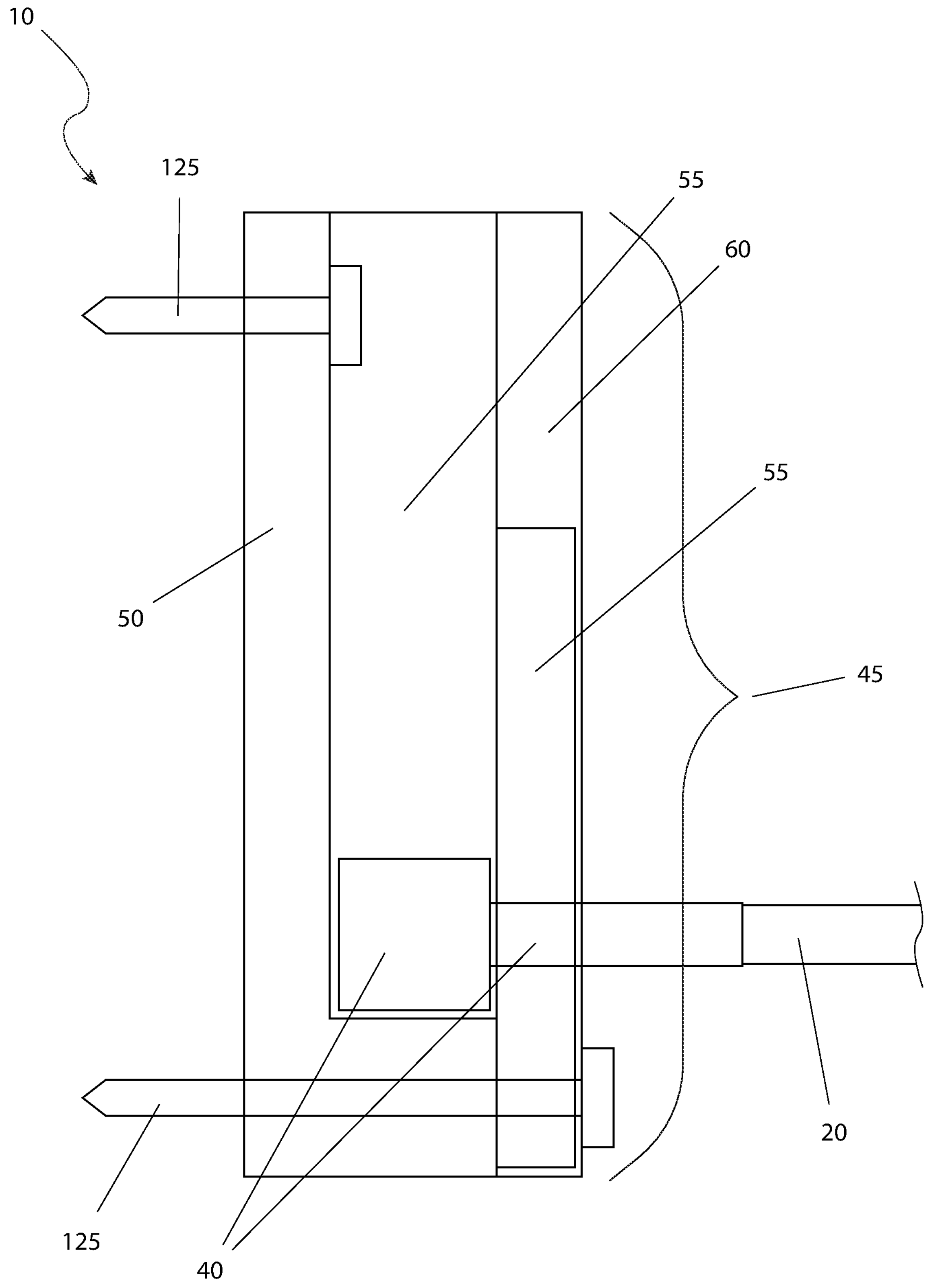
FIG. 3 is a sectional view of the screen door closing device 10, as seen along a line I-I, as shown in FIG. 1, according to the preferred embodiment of the present device; and, FIG. 4 is a sectional view of the screen door closing device 10, as seen along a line II-II, as shown in FIG. 1, according to the preferred embodiment of the present device.

Referring now to FIG. 3, a sectional view of the device 10, as seen along a line I-I, as shown in FIG. 1, according to the preferred embodiment of the present device is shown. The distal mounting bracket 45 is secured in position by one (1) or more fastening means 125 such as screws, bolts, nails, or the like, placed through the first back plate 50 and/or the front receiving cavity 55. The exact method of fastening means 125 employed is not intended to be a limiting factor of the present device. The tape 20 complete with the tee fitting 40 is securely placed through the receiving slot 60 and into the front receiving cavity 55 where it functions to attach the device 10 to the screen door 105 (as shown in FIG. 3).

Figure 4:
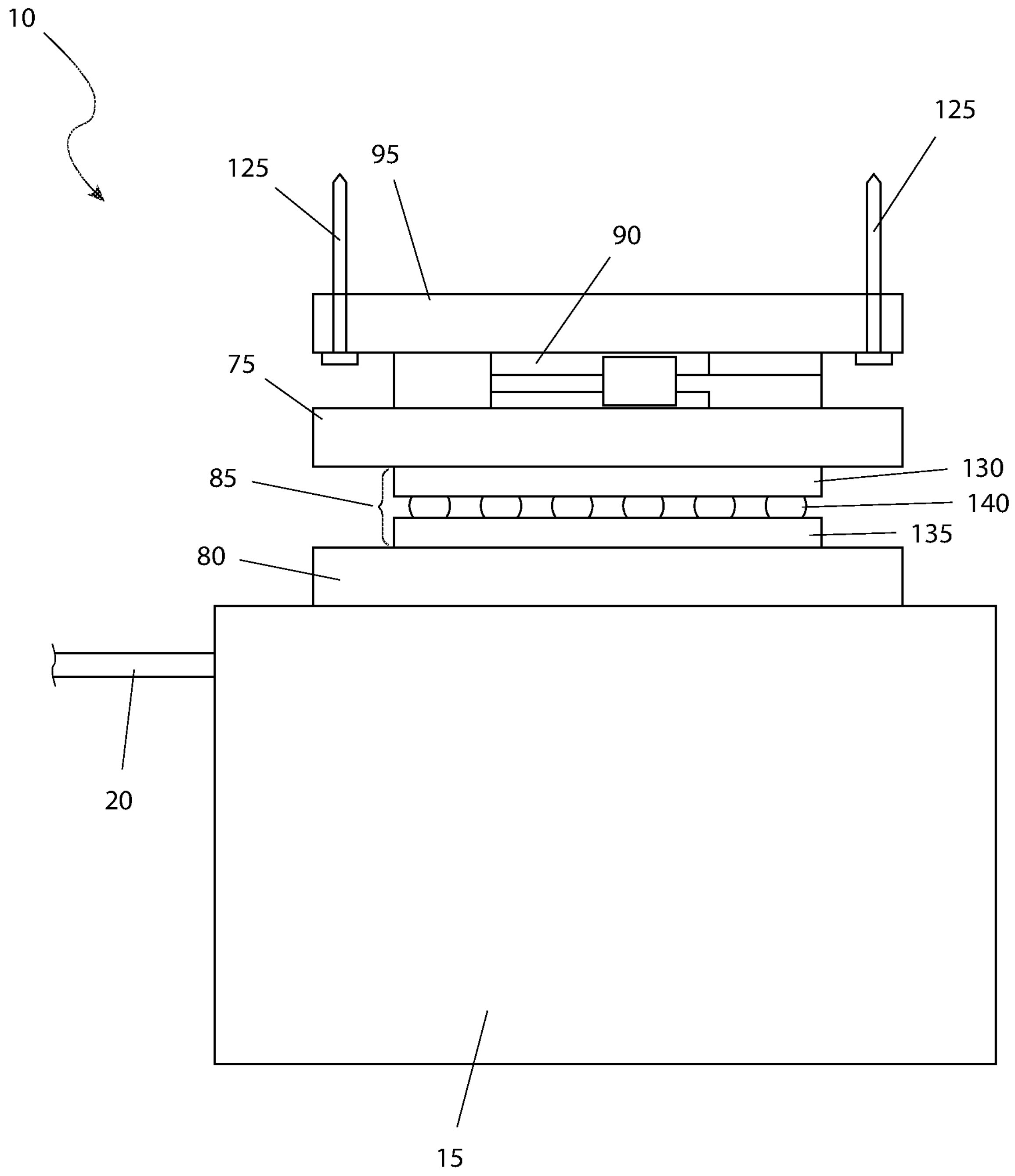

Referring to FIG. 4, a sectional view of the device 10, as seen along a line II-II, as shown in FIG. 1, according to the preferred embodiment of the present device is disclosed. The retraction reel 15 with the extended tape 20 is attached to the lower plate 80 immediately subjacent the ball bearing assembly 85. The ball bearing assembly 85 includes an upper race 130, a lower race 135, and multiple ball bearings 140 as is customarily expected. The upper plate 75 atop the ball bearing assembly 85 is connected to the proximal mounting bracket 95 via the quick disconnecting means 90, as aforementioned described. The proximal mounting bracket 95 is attached to the door jamb 115 (as shown in FIG. 2) via one (1) or more fastening means 125, such as screws, bolts, nails, or the like. The quick disconnecting means 90 allows easy removal of the upper plate 75, the lower plate 80, the ball bearing assembly 85 and the retraction reel 15 while leaving only the proximal mounting bracket 95 behind. Such a feature is envisioned to be beneficial should the total height clearance of the screen door 105 and or main door be needed for large pieces of furniture or the like. The ball bearing assembly 85 allows for swivel of the retraction reel 15 with respect to the proximal mounting bracket 95.

2. Operation of the Preferred Embodiment

The preferred embodiment of the present device can be utilized by the common user in a simple and effortless manner with little or no training. It is envisioned that the device 10 would be constructed in general accordance with FIG. 1 through FIG. 4. The user would procure the device 10 from conventional procurement channels such as hardware stores, home improvement stores, mechanical supply houses, mail order and internet supply houses and the like.

After procurement and prior to utilization, the device 10 would be prepared by installing the distal mounting bracket 45 upon the screen door 105 using the fastening means 125 in an appropriate location. The proximal mounting bracket 95 would then be installed upon the door jamb 115 using the fastening means 125 at an appropriate location. The retraction reel 15 would be connected to the proximal mounting bracket 95 using the quick disconnecting means 90, via the upper plate 75, the lower plate 80, and the ball bearing assembly 85. Next, the tape 20 would be manually extended along the travel path "t" 25 and the tee fitting 40 would be placed within the front receiving cavity 55 of the distal mounting bracket 45. The first mechanical adjustment 30 and the second mechanical adjustment 35 would be adjusted to within the needed parameters such that the screen door 105 does not open too far or too fast. At this point in time, the device 10 is ready for utilization.

During utilization of the device 10, the user would open the screen door 105 in a normal manner while being afforded protection from being opened too far or too fast. As such, components and surfaces of the screen door 105, the interior screen door surface 110, the screen door 105 and the automatic closing means 120 are protected from damage. Such opening and closing cycles are repeated as needed in a cyclical manner.

It is envisioned that the features of the device 10 provide the following benefits: a retractable, aesthetically-pleasing, highly-functional and adjustable device 10 when compared to commonly-available door travel-limit mechanisms, a realization of reduced repair costs of damaged doors and damaged door jambs, and a longer life cycle of a screen door 105 before replacement is required.

The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A screen door closing device, comprising:

a retraction reel having a spring-loaded mechanism enclosed therein and a tape extendable and retractable along a predefined linear travel path from the retraction reel;

a first mechanical adjustment operatively connected to the retraction reel and configured to limit a maximum extension length of the tape;

a second mechanical adjustment operatively connected to the retraction reel and configured to regulate a rate of extension and retraction of the tape;

a tee fitting fixed to a distal end of the tape;

a distal mounting bracket having a back plate, a receiving cavity, and a receiving slot sized to receive and retain the tee fitting;

a rotatable base plate attached to the retraction reel, the rotatable base plate comprising an upper plate and a lower plate separated by a ball bearing assembly to permit low-friction rotational movement of the retraction reel relative to a mounting surface; and, a quick disconnecting mechanism disposed between the upper plate and a proximal mounting bracket, the proximal mounting bracket configured for attachment to a doorjamb; and, wherein the quick disconnecting mechanism comprises a cam lock, angled linkage, thumbscrew, magnetic fastener, lever lock, or equivalent mechanical fastener configured to permit tool-free removal of the retraction reel from the proximal mounting bracket;

wherein the ball bearing assembly includes an upper race, a lower race, and a plurality of ball bearings arranged to facilitate smooth swiveling of the retraction reel about a vertical axis;

wherein the tape is adapted to limit both the speed and range of motion of an attached screen door during opening, and is further adapted to disconnect from the distal mounting bracket via the tee fitting without the use of tools;

wherein the distal mounting bracket is affixable to an interior surface of a screen door via one or more fasteners;

wherein the device is optionally paintable or manufactured in a variety of colors for aesthetic customization; and, wherein the screen door closing device is further adapted for installation as a kit on existing screen doors or as original equipment on new screen doors.

* * * * *